June 18, 1957     DEH CHANG TAO     2,795,992
MEASURING APPARATUS USING A LIGHT BEAM
Filed Aug. 23, 1954     3 Sheets-Sheet 1

INVENTOR.
DEH C. TAO
BY Oldham & Oldham
ATTORNEYS

June 18, 1957  DEH CHANG TAO  2,795,992
MEASURING APPARATUS USING A LIGHT BEAM
Filed Aug. 23, 1954  3 Sheets-Sheet 2

INVENTOR.
DEH C. TAO
BY Oldham &
Oldham
ATTORNEYS

June 18, 1957 DEH CHANG TAO 2,795,992
MEASURING APPARATUS USING A LIGHT BEAM
Filed Aug. 23, 1954 3 Sheets-Sheet 3

INVENTOR.
DEH C. TAO
BY
ATTORNEYS

United States Patent Office 2,795,992
Patented June 18, 1957

2,795,992

MEASURING APPARATUS USING A LIGHT BEAM

Deh Chang Tao, Akron, Ohio, assignor to Portage Machine Company, Akron, Ohio, a corporation of Ohio Application August 23, 1954, Serial No. 451,656

2 Claims. (Cl. 88—14)

This invention relates to measuring apparatus using a light beam in the measuring action and the invention especially is concerned with scale reading devices for use, for example, in conjunction with machine tools in order to provide accurate measuring means for movable components of machine tools.

Heretofore there have been various types of accurate measuring means or apparatus provided for various uses. However, insofar as I am aware, all of such previous types of measuring apparatus have involved relatively complicated and costly means in the measuring devices, and they have been difficult to maintain in accurate measuring condition. Furthermore, machine tools have relatively rough use in many instances and some of the types of accurate measuring means provided heretofore have been so delicate or sensitive so that they would require frequent servicing or adjusting in order to provide accurate measuring operations, or else such means might not be adapted for any use with a machine tool. Thus it would be very desirable to provide a sturdy scale reading or measuring apparatus that would maintain its accuracy even though subjected to rather rough operating conditions.

The general object of the invention is to provide accurate measuring apparatus adapted for relatively rough use, which apparatus is characterized by the relatively simple, uncomplicated construction of the measuring apparatus or system, and by the use of a light beam in the apparatus.

Another object of the invention is to provide accurate measuring apparatus, or scale reading apparatus wherein such measurement is made or scale is read by means of a light beam used in connection with a beam splitter, a photoelectric cell or cells, and current indicating or measuring means.

A further object of the invention is to use a light beam reflected from or transmitted through a scale having measuring lines of different light reflective or transmitting properties from the scale light reflecting or transmitting properties for accurate measuring operations.

A specific object of the invention is to provide a precision scale on a machine tool component wherein relative movement may occur between the scale and tool component for use in conjunction with a fixed rough scale carried by such machine tool unit and wherein the precision scale can be accurately moved a short distance along its axis.

Another object of the invention is to use a splitting prism on a controlled light beam reflected from or transmitted through a precision scale in order to split the beam and permit adjustment of the apparatus to balance the reflected light beams from the splitting prism, which balanced condition is indicated by a photoelectric cell or cells receiving light from the splitting prism and by current measuring means connected to or between such photoelectric cell means.

Another object of the invention is to position simple light generating means, light projecting means and light measuring means in a sturdy carrier on one of two relatively movable members to aid in measuring relative movement therebetween.

The foregoing and other objects and advantages of the invention will be made more apparent as the specification proceeds.

In order to understand the invention more completely, reference should be had to the accompanying drawings wherein one operative embodiment of the measuring apparatus of the invention is shown and wherein.

Figure 1:
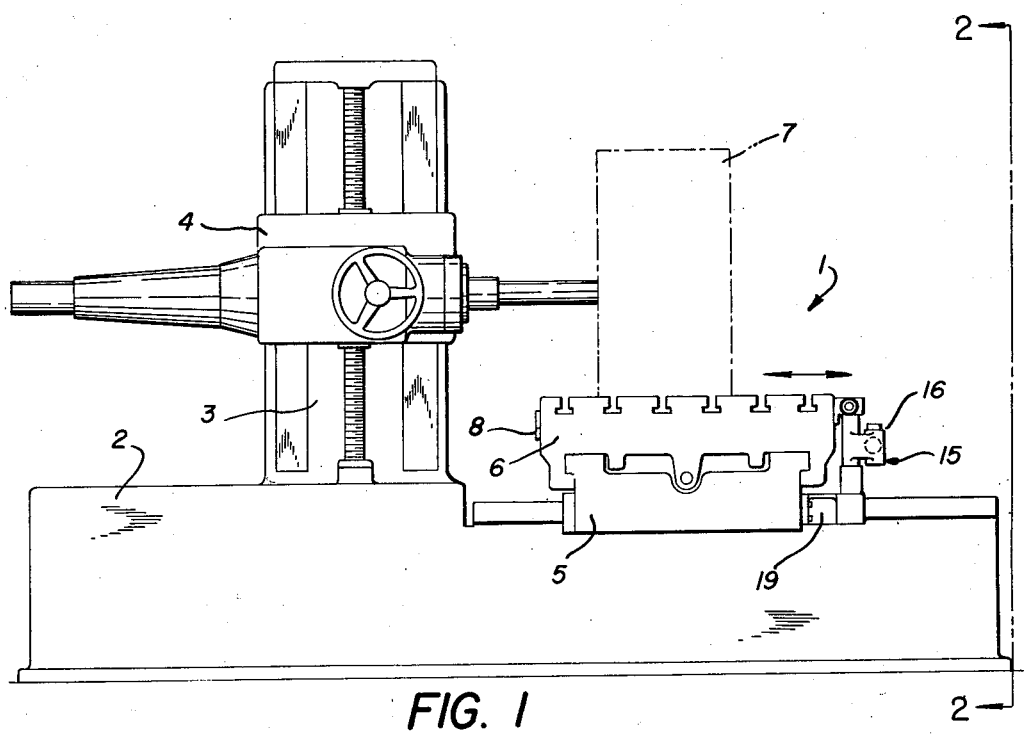
Fig. 1 is an elevation of measuring and scale reading apparatus embodying the principles of the invention shown on a machine tool.
Figure 3:
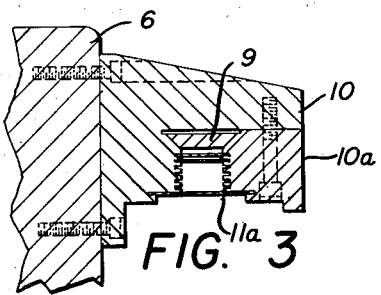
Fig. 3 is an enlarged section on line 3—3 of Fig. 2 of the precision scale and its housing.

The present apparatus relates in general to machine tools but can be used in other apparatus, where desired. The apparatus includes a movable member, a stationary member, a light source carried by one of the members, a scale having division marks thereon on the other member and having light reflective or transmitting properties that are sharply varied by the division or scale marks on the scale, and micrometer means for moving the scale relative to its positioning member. Additional means are provided for projecting a light beam against the scale with the light beam usually being wider and/or longer than the scale division marks, a light splitting prism is present in the apparatus, lens means are present in the apparatus for directing the reflected light beam onto the light splitting prism, and means for controlling the amount of light reaching the light splitting prism are provided. A pair of photoelectric cells are present in one embodiment of the apparatus and each receives one half of the portion of the light from the splitting prism when the light beam is centered on a scale mark. Current indicating, amplifying or measuring means connect the pair of photoelectric cells to show if equal amounts of light are received thereon to indicate when the scale is centered with a division mark in the center of the light beam directed onto such scale and such means may be used for performing a desired control action.

In the following specification and in the accompanying drawings, corresponding numerals are used to refer to corresponding parts so that comparison between the specification and drawing is facilitated.

With reference to the details of the structure shown in the drawings, the numeral 1 represents as a whole a machine tool which in this instance comprises a horizontal boring, drilling and milling machine. The horizontal boring, drilling and milling machine includes a frame 2 having a vertically directed column 3 thereon which positions a tool carrying head 4 thereon in a vertically adjustable manner. The machine tool 1 has a carriage 5 provided for movement longitudinally of the frame 2 by conventional control means provided therefor. The carriage 5 has a table 6 slidably engaged therewith for movement transversely of the frame 2 and carriage 5. A suitable work piece indicated by the numeral 7, is secured to the table 6 in a conventional manner so that the table 6 and carriage 5 can be adjusted with relation to the head 4 to permit the desired machining operations to be performed at proper locations on the work piece 7.

The novel scale reading means of the invention will be described particularly for transverse movement of the table 6 with relation to the frame 2 and carriage 5 for accurate positioning of the work piece 7 in such a direction. Of course, similar control means can be provided for accurately positioning the carriage 5 at a longitudinal position on the frame 2.

Figure 2:
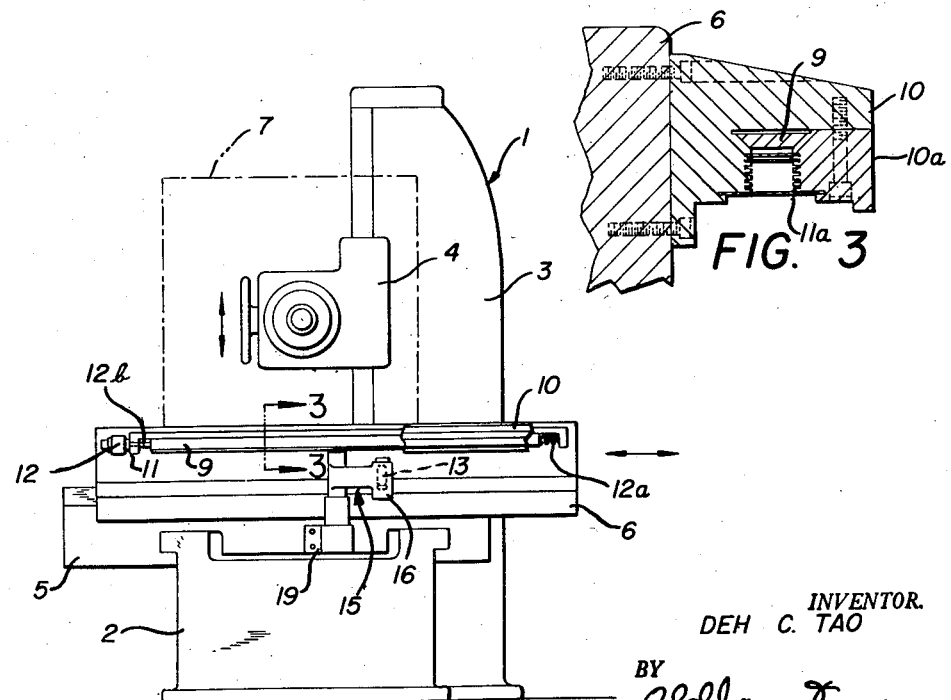
Fig. 2 is a side elevation of the apparatus of the invention taken on line 2—2 thereof.

The table 6 has a rough scale 8 secured thereto by which rough measurements of movement of the table 6 transversely of the carriage 5 can be made and a suitable reference marker (not shown) may be provided to aid in measuring such movement by use of the rough scale 8. At an opposite margin of the table 6, a precision scale 9 is carried by the table 6. The precision scale 9 is mounted in a housing, or enclosure 10 which is completed by a removable cover strip 10a. The scale 9 preferably is of trapezoidal shape and engages a complementary shaped recess or bore provided in the assembly of the housing 10 and cover strip 10a. A plurality of cover strips 11a are slidably positioned in the lower portion of the scale enclosure and engage opposed grooves in such enclosure. Suitable means (not shown) slide the cover strips 11a longitudinally with movement of the housing 10 and table 6 to expose the scale 9 continuously to light rays directed thereagainst, as hereinafter described. Fig. 2 of the drawings best shows that the scale 9 is also positioned by brackets or flanges 11 at the ends of the housing and the precision scale 9 in this instance is downwardly directed. Such positioning of the precision scale prevents any accumulation of dirt, dust or lint thereon and aids in maintaining the desired accuracy in the apparatus of the invention and prevents entry of light into the housing to reach the scale 9.

The precision scale 9 is adapted to be accurately moved a limited distance, such as .1" in either direction, with relation to the table on which it is positioned. Thus a micrometer, indicated in general by the numeral 12, is suitably secured to one end of the precision scale 9 for accurate movement of the precision scale by the micrometer to vary the position of such scale with relation to the table 6. As indicated in the drawings, the precision scale 9 may be slidably carried in the housing and have a spring 12a compressed between one end of the scale and one of the brackets 11 to urge the precision scale towards the micrometer 12. A shaft 12b of the micrometer bears on the adjacent end of the precision scale 9 and controls its position on the bracket in the embodiment of the invention shown herein.

Figure 4:
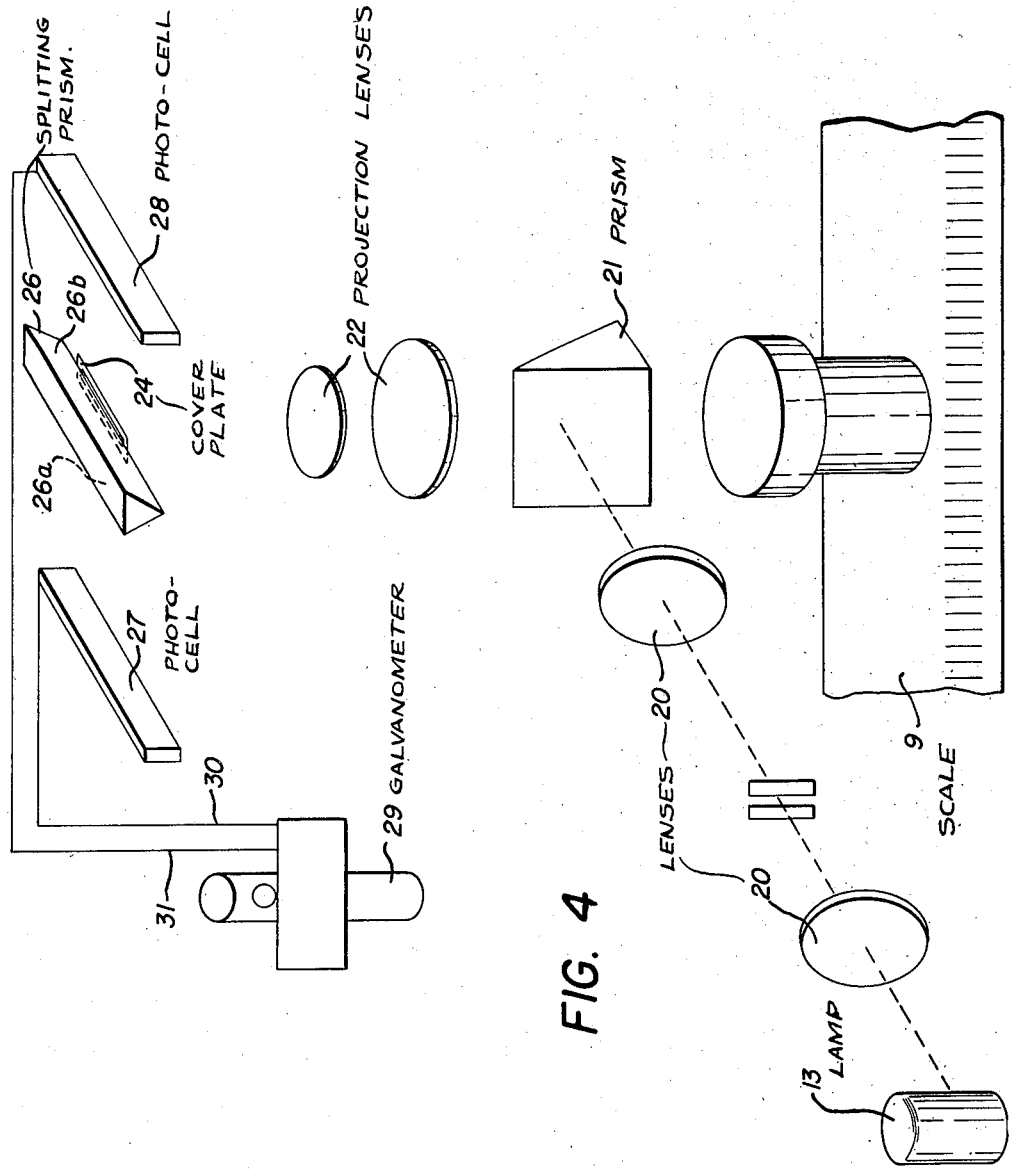
Fig. 4 is a diagrammatic view of the apparatus of the invention.
Figure 5:
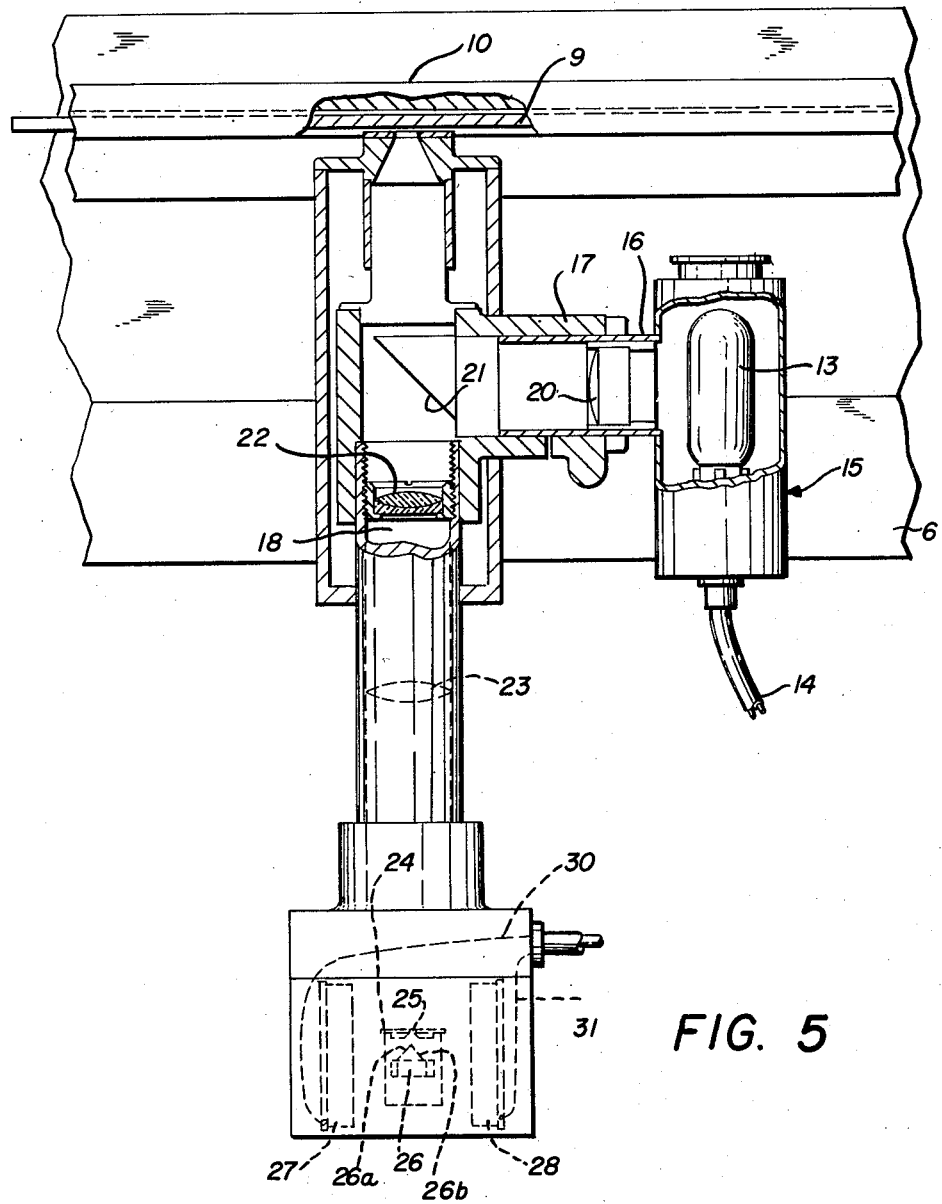
Fig. 5 is an enlarged elevation, partly broken away and shown in section, of the apparatus of the invention.

The actual light generating means and measuring and/or scale reading means of the invention is shown in more detail in Figs. 4 and 5. Such means includes a conventional electric lamp 13 provided with electrical energy through leads 14 connected to a conventional source of electricity. The lamp 13 is positioned in a housing 15 having a tubular offset or arm 16 thereon which provides the only passage for light rays from the housing 15. Such arm 16 is engaged with a positioning tube 17 that forms part of an integral enclosure 18 in which the light transmitting means of the invention are positioned. A bracket 19 secures the enclosure unit 18 to the carriage 5.

Any desired number of collecting or condensing lenses 20 are positioned in the arm 16, or the tube 17, for collecting light rays or beams from the lamp 13 and directing such light beams onto a prism 21 suitably positioned in the enclosure unit 18. The prism 21 bends the light rays from the lens 20 ninety degrees and directs them longitudinally along the axis of the enclosure unit 18 towards the precision scale 9. Usually the precision scale 9 is made from a material having high light reflective properties whereas the scale or division lines or marks provided thereon are made in a contrasting manner to have very poor light reflective properties. Or, the conditions could be reversed and the lines would have high light reflective properties and the scale surface itself would be poorly reflective as long as a contrast exists in the reflective properties of the scale and the division lines. A glass scale may be used and have different light transmitting properties at the marks thereon.

The light rays or beam reflected from the surface of the precision scale 9 is divided into two parts by any indicating or scale line on the scale straddled by the projected beam and passes back by reflection into the enclosure unit 18 and through any desired control lens therein, which lens usually comprises a projection lens 22. The light beams passing from the projection lens 22 are transmitted to the lower portion of the enclosure unit 18 for accurate measuring action therein. The lower portion of the enclosure unit 18 may be adjustable in position with relation to the upper portion thereof to permit focusing of light beams passing through the lens 22, if desired. Suitable telephoto lens means, or other similar lens 23, are positioned in the lower portion of the enclosure unit 18 and one or more light beams reaching the telephoto lens 25 are accurately transmitted therethrough and magnified therein to be directed onto a cover plate 24 having a slot or other aperture 25 therein. The aperture 25 corresponds in shape to the scale or division line or mark on the precision scale 9 and passes the light beam to the apex of a splitting prism 26 fixed in the lower portion of the enclosure unit 18. This splitting prism 26 usually is of triangular shape in section and is a relatively elongate member positioned parallel to the light beams reflected back into the enclosure unit 18 when such beam or beams are elongate. The splitting prism 26 is adapted to direct any light beams contacting opposite faces 26a and 26b thereof outwardly of such splitting prism parallel to the base surface of the prism in the embodiment of the invention shown herein. If a divided beam is reflected from the precision scale 9, the different portions would be directed onto opposite faces of the prism 26 when a balanced or centered measuring condition exists.

The enclosure unit also includes a pair of photoelectric cells 27 and 28 of any desired conventional construction and these photoelectric cells 27 and 28 are positioned to receive the rays transmitted from the different surfaces of the splitting prism 26. The photoelectric cells 27 and 28 are connected to oppose each other through a conventional galvanometer or other current measuring or indicating means 29, by leads 30 and 31 so that the galvanometer will indicate if any current is flowing in the circuit, which current would be produced by unbalanced light beams striking the two photo cells 27 and 28.

Thus in operation, when the table 6 has been accurately positioned so that the light beam from the lamp 13 is accurately centered on a division or scale line or mark on the precision scale 9, then equal amounts of light will be reflected back into the enclosure unit from each side of the scale mark on which a measurement is being taken. Such equal amounts of light or beams will be passed back into the enclosure unit and will ultimately be transmitted to the splitting prism 26 for reflection of one of such beams from both surfaces 26a and 26b thereof. Accordingly, the photoelectric cells 27 and 28 will be equally and simultaneously actuated so that similar voltages will be transmitted therethrough and the galvanometer 29 will be centered on zero due to no resultant current flowing therethrough.

In some instances, it may be desirable to provide a slotted cover plate on the enclosure unit 18 to control the light transmitted thereto from the scale 9. If light is to be transmitted through the precision scale 9 for a measuring or reading action, then the lenses 22 and 23 and splitting prism 26 and associated means would be adjacent the opposite face of the scale 9 from the prism 21.

In use of the apparatus of the invention, the apparatus is initially set to a zero position at which time the galvanometer 29 indicates a zero reading. This setting can be made by manually or otherwise moving the movable member to roughly its zero position and the micrometer 12 will be used to position the precision scale so that the precision scale reading unit can be accurately and easily set to a true zero position. Then usually a first desired operation is performed on an article secured to the table 6 of the machine tool, and the table is moved to the rough dimension of the accurate dimension desired for the next operation. For instance, if a reading of 20.6555″ is desired the table is first moved roughly 20.6″ by manual or other means as measured by the rough scale 8 and then the table is carefully moved by any desired control means therefor so that the precision scale reading unit zeroes on 20.6″ so that an accurate movement of 20.6″ has been effected on the table 6. Next by means of the micrometer 12, the scale is moved .0555″. Lastly the table is moved manually until the precision measuring means again is zeroed on the precision scale at 20.6″ and an accurate setting of the table to 20.6555″ has been secured.

From the foregoing it is seen that an accurate or precision type of measuring and/or scale reading apparatus has been provided by the invention. This apparatus operates by the passage of light rays in an uncomplicated manner through a few conventional lens and prism means that are carried in a sturdy housing positioned on the machine tool frame. By enclosing the precision scale and mounting it as shown herein, it is possible to provide a sturdy type of apparatus which will have a long, effective service life with a minimum of maintenance thereon.

Any conventional power source is connected to the photoelectric cells 27 and 28.

In this specification and claims, "transmitting" in relation to light directed onto the precision scale 9 can refer to light passing therethrough or it can refer to light reflected therefrom dependent on whether the scale would be made from a transparent or opaque material.

While one complete embodiment of the invention has been disclosed herein, it will be appreciated that modification of this particular embodiment of the invention may be resorted to without departing from the scope of the invention as defined in the appended claims.

What I claim is:

1. In a machine tool, a frame, a movable table on said frame, a scale having division marks thereon of different light reflective properties with relation to the scale movably carried by the table, a micrometer for accurately moving said scale with relation to said table, a light beam producing unit secured to the frame and including a light source, a prism, a condenser lens for directing light rays onto said prism, said prism directing the light rays onto said scale from which the light rays are reflected, a splitting prism for dividing light rays received thereon into two separate beams, means having an aperture therein covering said splitting prism and passing only a band of reflected light rays thereto, telephoto lens means for directing the reflected rays onto the apertured area of said last-named means, a pair of photoelectric cell means for individually receiving the reflected divided light beams from said splitting prism, and means connected to said pair of photoelectric cell means to register any difference in light rays transmitted thereto as indicated by the voltages thereof whereby accurate positioning of said table may be attained.

2. In a machine tool, a frame, a movable table member on said frame, a downwardly directed scale member having division marks thereon of different light reflective properties with relation to the scale surface movably carried by the table, cover means for said scale member movably carried by said frame to expose only a desired portion of said scale member, a micrometer for accurately moving one of said members with relation to said table, a light beam producing unit secured for directing light rays onto said scale from which the light rays are reflected, a splitting prism for dividing light rays received thereon into two separate beams, lens means for directing the reflected rays from said scale onto said spliting prism, a pair of photoelectric cell means for individually receiving the reflected divided light beams from said splitting prism, and means connected to said pair of photoelectric cell means for activation thereof when current flows between said photoelectric cell means.

References Cited in the file of this patent

UNITED STATES PATENTS

| 2,039,231 | Linder | Apr. 28, 1936 |
| 2,406,299 | Koulicovitch | Aug. 20, 1946 |
| 2,692,527 | Wetzel et al. | Oct. 26, 1954 |

FOREIGN PATENTS

| 888,892 | France | Sept. 20, 1943 |